United States Patent Office 3,306,861
Patented Feb. 28, 1967

3,306,861
PROCESS FOR PRODUCING UREA-
FORMALDEHYDE FOAMS
Ged H. Justice, Hopewell, Va., assignor to Allied Chemical Corporation, New York, N.Y., a corporation of New York
No Drawing. Filed Sept. 10, 1962, Ser. No. 222,664
4 Claims. (Cl. 260—2.5)

This invention relates to urea-formaldehyde resin foams, and more particularly to foams in which the formaldehyde odor, particularly residual odor, is substantially suppressed or eliminated, and to a process for preparing such odor-free foams.

Urea-formaldehyde foams have been prepared in the past, and are useful when solidified as acoustical and insulating compositions.

In general, such urea-formaldehyde foams may be prepared by whipping or beating an aqueous, partially resinified urea-formaldehyde reaction product containing a foaming agent and an acidic hardener into a foam and permitting the foam to harden under the action of the hardening agent, or alternatively, urea-formaldehyde foams may advantageously be prepared by separately producing (1) a partially resinified aqueous urea-formaldehyde solution, (2) a liquid acidic foam, as by atomizing a gas such as air into a aqueous acidic hardener solution composed of water, a foaming agent, and an acidic material hardening agent for the resin. Thereafter, the resin solution and foamed hardener are mixed as in a foam gun. The resulting resinous foam is then cured, i.e. allowed to harden or solidify.

In spite of the excellent insulating properties of such hardened urea-formaldehyde foams, their use has been considerably limited because of the strong formaldehyde odor which not only accompanies preparation of the resinified foam but which tends to persist in the finished insulation over considerable periods of time. As is well known, the odor of formaldehyde is extremely pungent and is irritating to the eyes and respiratory systems of those who come in contact with it.

It has been observed that formaldehyde odor in the urea-formaldehyde foams is due to the presence not only of free formaldehyde in the system but also to the presence of formaldehyde-yielding bodies wherein the formaldehyde is combined in the form of N-methylol groups. Free formaldehyde is noticeable in the foam at all free formaldehyde concentrations above about 0.1%. Higher concentrations of methylol groups can be tolerated, i.e. as high as about 1% concentrations of methylol groups can be present without giving rise to objectionable odor. Substantial reduction in the initial formaldehyde odor which accompanies preparation of the resinified foam has been achieved in the past through the addition to the partially resinified aqueous urea-formaldehyde resin solution of a small proportion of ammonium bicarbonate or ammonium carbonate prior to mixing the resinous solution with the foamed hardener solution as described in my copending application Serial No. 157,255 filed December 5, 1961. Such addition, while of great value in alleviating formaldehyde irritation to personnel during preparation and application of the foams, has not been completely effective in eliminating the persistence or recurrence of formaldehyde odor in the finished insulation, so that houses or other structures containing such insulation are often plagued with the unpleasant odor over long periods of time. Some alleviation of the persistence of the odor has been achieved by including other additives such as terpenes with the ammonium carbonate or bicarbonate added to the resin solution, but complete elimination, and non-recurrence of odor has not heretofore been successfully accomplished.

An object of the present invention is to provide a urea-formaldehyde foam wherein recurrence of objectionable formaldehyde odor after hardening and storage for substantial periods is prevented.

A further object of the invention is to substantially reduce the concentration of methylol groups in the urea-formaldehyde foam.

These and other objects are accomplished according to my invention wherein the partially resinified urea-formaldehyde reaction product is subjected to a brief heating treatment at temperatures between about 110° C. and about 135° C. at pH values between about 4 and about 5 for a period sufficient to substantially reduce or eliminate methylol groups but insufficient to raise the viscosity of the resin solution above about 55 centipoises measured at 25° C.

In preparing urea-formaldehyde resin solutions for foaming, it is customary to react urea and formaldehyde in a first stage under alkaline conditions to produce a urea-formaldehyde condensation product consisting primarily of bodies in which the formaldehyde is bound in the form of N-methylol groups. It is also known to react the urea-formaldehyde condensation product in a second stage under acidic conditions at temperatures not higher than the boiling temperature of water to partially resinify the condensation product so that eventual hardening of the foamed resin will take place rapidly when resin solution and hardener solution are blended. Care, of course, must be taken not to carry the resinification so far at this stage as to produce a viscous resin solution which will not lend itself to foaming either by mechanical whipping with an acidic foaming solution or by blending with a foamed hardener. Thus, the limit to which resinification can advantageously be carried is indicated by a viscosity of not more than about 55 centipoises (measured at 25° C.). Suitable viscosities at this stage are usually between about 20 centipoises and about 45 centipoises.

The above second stage partial resinification step as usually carried out, however, leaves about 1% to 5% free formaldehyde in the mixture and usually between about 6% and about 12% of formaldehyde combined as M-methylol groups, both of which contribute to objectionable formaldehyde odor in the finished foam.

As pointed out above, initial odor due to free formaldehyde can be controlled by addition to the partially resinified aqueous urea-formaldehyde resin solution of a small proportion of ammonium bicarbonate or ammonium carbonate prior to foaming as described in my copending application above referred to.

My present process acts, in a manner not entirely clear, to substantially completely convert the methylol groups present in the partially resinified solution to a form which is no longer capable of splitting off formaldehyde, and yet to a point where it has not assumed the high viscosity of a completely reacted or "set" resin.

In carrying out the process according to my invention, the partially resinified aqueous urea-formaldehyde solution to be foamed is prepared in any suitable manner which includes a partial resinification step carried out at temperatures between about 110° C. and about 135° C. at pH between about 4 and about 5 for a period sufficient to produce a resin solution viscosity between about 20 centipoises and about 55 centipoises, preferably between about 25 and about 45 centipoises (measured at 25° C.). Pressure equipment may be used to maintain the required temperatures, and concentrated resin solutions of relatively low vapor pressures may be desirably be employed.

The resin solution used in the process of my invention is preferably produced, by first preparing a clear mobile non-resinous stable fluid composition composed of a mixture of between about 40 parts and about 70 parts by weight of a non-resinous urea-formaldehyde condensation product having an average molecular weight within the range between about 120 and about 240 together with from about 15 to about 45 parts by weight of free formaldehyde, between about 20 and about 60 parts by weight of free urea and between about 45 and about 90 parts of water. For this purpose I prefer to utilize urea-formaldehyde solutions in which the formaldehyde component and part of the urea are supplied in the form of a stabilized solution of urea-formaldehyde reaction products prepared according to the teachings of U.S. Patent 2,652,377, issued September 15, 1953 and commercially available under the trade name "U.F. Concentrate–85." "U.F. Concentrate–85" is a clear, colorless, viscous, stabilized solution of formaldehyde and urea reaction products in a small amount of water. It contains about 15% water and approximately 85% solids, the latter combined in a formaldehyde to urea mol ratio of about 4.6 to 1. It is believed to be a mixture of polymethylol ureas in solution.

In preparing the resin solution according to my invention, a mixture of urea and formaldehyde, as described above, and preferably having a formaldehyde to urea ratio of between about 1.5 and about 2.0 and a solids content of between about 50% and about 65% is first reacted in a conventional first stage under neutral to slightly alkaline conditions, for example, at a pH of between about 7 and about 10 by heating the mixture to between about 80° C. and about 95° C. for a short period of say 10 to 30 minutes to substantially completely react all the urea with formaldehyde.

After completion of this initial reaction the reaction mixture consists almost entirely of a mixture of polymethylol ureas, virtually all of the formaldehyde being present in this form and available as formaldehyde unless further reacted. Free formaldehyde at this stage will usually be between about 1% and about 5%, while formaldehyde bound as methylol groups may range between about 6% and about 12% based on the weight of the resin solution (of approximate solids content 50–65%).

In a second stage, which is the critical step of my invention, further condensation is carried out under acid conditions and at unusually high temperatures. Thus, the acidity is adjusted to pH between about 4 and about 5, and the resin solution is heated at temperatures between about 110° C. and about 135° C. until methylol ureas are substantially eliminated. The pH is critical for the success of the process, since below pH 4 the rate of reaction is too fast for easy control of the reaction at the high temperatures employed so that requisite viscosities may be exceeded, and at pH above 5, the reaction is too slow for commercial application of the process. This second stage condensation is carried out until the viscosity, measured at 25° C. is at least about 20 centipoises, preferably between about 25 and about 45 centipoises. These viscosities are conventional for urea formaldehyde resins for foaming; resins with viscosity below about 20 centipoises are unstable and thus precipitate solid material on standing, while resin solutions having viscosities above about 45 centipoises are unstable on long storage, but usable for resinified foams up to about 55 centipoises. As brought out above, reaction at the high temperatures of my invention reduces the N-methylol bodies in the resin to a point where they no longer give rise to objectionable formaldehyde odor in the finished foam, i.e., to methylol concentrations of not more than about 1% based on the weight of the resin solution.

The formaldehyde in the resin which is free and that which is combined as N-methylol groups is easily determined by a modification of the standard bisulfite method as described, for example, in "Quantitative Organic Analysis Via Functional Groups" by S. Siggia, First edition, page 13—John Wiley and Sons, Inc., New York. The aqueous bisulfite reacts with free formaldehyde rapidly at 0° C. and it reacts further in a similar way at 80° C. with formaldehyde which is combined in the form of N-methylol groups. Alternatively, the free formaldehyde may be determined by the hydroxylamine hydrochloride method and total formaldehyde by the iodimetric method—see G. Smets and A. Borzee, J. Polymer Sci., 8, 371–94 (1952).

The effect of temperature of heating at pH 4–5 is illustrated in Table I below which shows the free formaldehyde content and methylol content of a 52% solids concentration urea formaldehyde resin solution similar to that described in the example, when heated for sufficient time to reach a viscosity of 20–25 centipoises at varying temperatures from 80° C. to 115° C. Free formaldehyde was determined by the bisulfite method at 0° C. as described above, free formaldehyde plus methylol formaldehyde was determined by the modified bisulfite method at 80° C. Methylol content is calculated by difference.

TABLE I.—VARIATION IN FORMALDEHYDE AND METHYLOL CONCENTRATIONS OF U-F RESIN WITH ACID AT VARYING TEMPERATURES

| Temperature, ° C. | Times, Minutes | Free HCHO,[1] Percent | Free plus Methylol HCHO,[2] Percent | Methylol HCHO, Percent |
| --- | --- | --- | --- | --- |
| 80 | 18 | 1.55 | 4.4 | 2.85 |
| 90 | 10 | 1.82 | 4.4 | 2.58 |
| 100 | 8 | 1.25 | 4.0 | 2.75 |
| 105 | 7 | 1.00 | 3.3 | 2.30 |
| 115 | 5 | 0.60 | 1.0 | 00.4 |

[1] By Bisulfite method at 0° C.
[2] By Bisulfite method at 80° C.

It will be noted from Table I that methylol content is not substantially reduced until the temperature of 105° C. is exceeded. I have found that temperatures of at least about 110° C. are required to reduce methylol content of the resin to the unobjectionable point of not more than about 1% by weight of the resin solution while avoiding increase of resin solution viscosity above about 45 centipoises.

It will be further noted, that the resin solutions prepared by my process above outlined, not only have a sharply reduced methylol content, but also have experienced a marked reduction in free formaldehyde, making them satisfactory for use in certain applications. However, such solutions often still contain a small but objectionable amount of free formaldehyde. Consequently, in such cases, if the resins are to be formed into foams, it is desirable to decrease the free formaldehyde in some manner, as for example, by addition to the resin solution of a small proportion, for example 1 to 3%, of ammonium carbonate or bicarbonate in accordance with my copending application Serial No. 157,255 filed December 5, 1961.

Thus, after the second stage condensation is completed, the substantially methylol-free, aqueous resin solution is adjusted to pH about 7 to 8 and cooled to room temperature. Ammonium carbonate or bicarbonate is added if desired, and optionally a small proportion of a resin stabilizer such as ethylene glycol may be added before or after the condensation step.

The hardener solution is preferably prepared by adding between about 1% and about 10% of a foaming agent to a 0.05 to 0.5 normal acid solution. Any conventional foaming agent may be used and I have found triethanolamine salt of benzene sulfonic acid and "Nacconol SZA," an alkyl benzene sulfonic acid composition of which about 85% consists of sulfonic acids and which has a pH of 1.5 to be suitable. The aqueous acid solution may be of any strong acid such as, for example, sulfuric acid, hydrochloric acid, formic acid, etc.

The resin and hardener solutions may be mixed and foamed in any suitable manner, either by mixing the solutions first and subjecting the blended solution of whipping and beating to cause foaming, or preferably the hardener solution is first foamed in conventional manner known to produce a closed cell foam as by mixing with air.

Weight ratio of hardener solution to resin solution may be varied between about 0.5 and about 2.3; however, I prefer to use a ratio of between about 1.5 and about 2.0.

When the hardener solution is foamed before blending with resin solution, the foamed hardener and the resin solution are mixed in any desired manner to produce diffusion of the resin solution into the foam solution without breaking the foam as by use of a conventional foam gun. I prefer, however, to carry out the mixing according to U.S. application Serial No. 156,830 filed December 4, 1961, in the names of Donald S. Shriver, Robert R. MacGregor and William P. Moore, by injecting the resin solution into a stream of foam flowing at a space velocity of about 15,000 hr.$^{-1}$ to about 25,000 hr.$^{-1}$, followed by curing the mixture in a stream flowing at a space velocity of between about 1,500 hr.$^{-1}$ and about 2,500 hr.$^{-1}$ for a period sufficient to produce a self-supporting foam.

The resulting foams are substantially free of initial formaldehyde odor and odor recurrence upon storage is substantially eliminated.

The following specific example further illustrates my invention. Parts are by weight except as otherwise noted.

EXAMPLE

A. Resin preparation

The following materials were mixed and adjusted to pH 8 with 4 N sodium hydroxide:

| | Parts by weight |
|---|---|
| U.F. Concentrate-85 (60% formaldehyde, 25% urea, 15% water) | 100 |
| Urea | 35 |
| Ethylene glycol | 2.5 |
| Water | 90 |

The reaction mixture was stirred and heated to 95° C. This temperature was maintained for 30 minutes, during which time the pH dropped slowly to 6.6. The resin solids concentration at this stage was about 52% and the solution contained a total of 11.35% by weight, based on the weight of the solution, of free and combined formaldehyde, of which 1.3% was free formaldehyde and 10.05% was combined as methylol groups.

At the end of 30 minutes 0.5 ml. of 4 N formic acid was added which reduced the pH of the reaction mixture to 5.0. Heating was then continued at about 115° C. in a pressure autoclave for 5 minutes. The reaction mixture was cooled and the pH was raised to 8.0 with 4 N NaOH. Viscosity at 25° C. was 25 cps. The free-formaldehyde content of the resin solution was 0.60%, the methylol content was 0.40%. Addition of 2 grams of ammonium bicarbonate reduced the free formaldehyde content of the resin to 0.2%.

B. Hardener solution

A hardener solution was prepared by dissolving 2 grams of "Nacconol SZA" in 100 grams 0.1 N sulfuric acid solution. A foam was produced by mixing 50 grams of resin with 100 grams of hardener solution while stirring rapidly. The wet foam had no formaldehyde odor. The foam hardened to a spongy mass which had no formaldehyde odor during storage for several weeks.

Similar results are obtained when the hardener solution is first foamed by atomizing air therein, and thereafter blending the foamed hardener with the resin solution in a foam gun.

While the above describes the preferred embodiments of my invention, it will be understood that departures may be made therefrom within the scope of the specification and claims.

I claim:
1. In a process for preparing a partially resinified urea-formaldehyde resin solution adapted to be converted into a resinous foam substantially free of odor, the step of substantially eliminating the methylol content of the resin, which comprises heating an aqueous solution of urea-formaldehyde reaction product in the form of polymethylolurea containing between about 50% and about 65% urea-formaldehyde solids in the ratio of formaldehyde to urea of between about 1.5 and about 2.0 to a temperature between about 110° C. and about 135° C. at pH between about 4 and about 5 for a time sufficient to substantially reduce methylol groups, but insufficient to increase the viscosity of the solution above about 55 centipoises measured at 25° C.

2. The process according to claim 1 wherein the temperature of heating is between about 115° C. and about 130° C. and the ultimate viscosity of the heat-treated resin solution is between about 25 centipoises and about 45 centipoises measured at 25° C.

3. The process according to claim 1 wherein the methylol content of the resin is reduced to not more than about 1% by weight of the resin solution.

4. A process for preparing solid urea-formaldehyde foams free from residual formaldehyde odor from aqueous urea-formaldehyde resin solutions containing odorous formaldehyde-yielding bodies in the form of N-methylol groups, which comprises (1) preparing an aqueous solution of a urea-formaldehyde reaction product containing between about 50% and about 65% of urea-formaldehyde solids in the ratio of formaldehyde to urea between about 1.5 and about 2.0 and consisting substantially completely of polymethylol ureas, (2) subjecting said reaction product to a temperature between about 110° C. and about 135° C. at pH between about 4 and about 5 for a period sufficient to reduce methylol groups to not more than about 1% of the resin solution and to provide a solution viscosity between about 25 centipoises and about 45 centipoises measured at 25° C., (3) preparing a foamed hardener solution comprising an aqueous acidic solution of a foaming agent, (4) mixing said methylol-free resin solution and said foamed hardener solution in proportions in a weight ratio of between about 0.5 and about 2.3 parts of hardener per part of resin solution and permitting the resulting foamed mixture to harden whereby a hardened foam, free from residual formaldehyde odor, results.

References Cited by the Examiner

UNITED STATES PATENTS

| | | | |
|---|---|---|---|
| 1,986,067 | 1/1935 | Paquin | 260—69 |
| 2,191,949 | 2/1940 | Belfit | 260—69 |
| 2,625,524 | 1/1953 | Kvolnes | 260—69 |
| 2,652,377 | 9/1953 | Kise | 260—69 |
| 2,813,780 | 11/1957 | Vieli | 269—2.5 |
| 2,872,425 | 2/1959 | Paz | 260—69 |
| 2,995,541 | 8/1961 | Kropa | 260—69 |
| 3,006,871 | 10/1961 | Sunderland | 260—2.5 |
| 3,117,098 | 1/1964 | Eberl et al. | 260—2.5 |

FOREIGN PATENTS 545,538  8/1957  Canada.

MURRAY TILLMAN, *Primary Examiner.*
L. J. BERCOVITZ, *Examiner.*
M. FOELAK, *Assistant Examiner.*